United States Patent [19]

Bimba

[11] 3,848,325

[45] Nov. 19, 1974

[54] METHOD FOR ASSEMBLING BODY AND END SECTIONS FOR FLUID POWER CYLINDER

[76] Inventor: Charles W. Bimba, 101 Main St., Monee, Ill. 40449

[22] Filed: Aug. 30, 1973

[21] Appl. No.: 393,006

Related U.S. Application Data

[63] Continuation-in-part of Ser. No. 249,346, May 1, 1972, Pat. No. 3,811,367.

[52] U.S. Cl................ 29/511, 29/156.5 R, 29/510, 29/516, 29/526, 29/157 R, 29/421 M
[51] Int. Cl............................................ B23p 17/00
[58] Field of Search......... 29/421 M, 516, 509, 510, 29/511, 515, 521, 525, 526, 421 R, 156.5 R, 157 R, 447; 92/165, 169; 287/20.3, 20.5; 285/382.2

[56] References Cited
UNITED STATES PATENTS

| | | | |
|---|---|---|---|
| 1,923,546 | 8/1933 | Lindemann et al.................. | 285/56 |
| 2,580,910 | 1/1952 | Harman............................... | 200/166 |
| 2,741,498 | 4/1956 | Elliott................................. | 29/521 X |
| 2,957,734 | 10/1960 | McLeod.............................. | 220/67 |
| 3,087,747 | 4/1963 | Novotny.............................. | 285/398 |
| 3,313,536 | 4/1967 | Dutton et al........................ | 29/421 M X |
| 3,417,456 | 12/1968 | Carlson............................... | 29/510 X |
| 3,518,920 | 7/1970 | Bimba................................. | 92/168 |
| 3,590,464 | 7/1971 | Wildi................................... | 29/421 M |

Primary Examiner—C. W. Lanham
Assistant Examiner—Victor A. DiPalma

[57] ABSTRACT

A non-loosening, high pressure resistant system for connecting an end cap member of a fluid power cylinder to the tubular body section by providing a special flat-bottomed and sloping wall groove in the periphery of each end cap and then rolling or otherwise forcing the end portion of the tubular body section down into the groove to make an assembled connection. The deformed end of the body section is subsequently locked into the groove of the end cap to provide longitudinal strength by rolling a narrow shoulder portion of the end cap down thereover, while still further circumferential and longitudinal strength is provided by having a pressfit band encompass the previously engaged portions of the tubular body section and the end cap.

6 Claims, 6 Drawing Figures

METHOD FOR ASSEMBLING BODY AND END SECTIONS FOR FLUID POWER CYLINDER

This application is a continuation-in-part of my co-pending application Ser. No. 249,346, now U.S. Pat. No. 3,811,367, filed May 1, 1972.

The present invention relates to an improved system for constructing fluid power cylinders such that the resulting connections between the tubular body section and the end caps provide both longitudinal and circumferential strength. In a more specific aspect, the invention provides for effecting the combination of an improved peripheral groove in each cap and a locked-in end portion for the tubular body section, as well as a press-fit band to encompass the rolled and engaged portions of the body section and the end cap.

There have been various constructions for fluid power cylinders where an end portion of the tubular body section is rolled into a small groove around the end cap; however, such groove means have generally been of a small V-shape and have not had both a continuous ring of overlapping metal from the end cap itself and a separate reinforcing, press-fit ring to provide a tight locking arrangement. In connection with air cylinders, the maximum air pressure is usually about 250 psig and the simple rolled-in engagements are satisfactory; however, for hydraulic cylinders, where the operating pressures are of the order of 1,000 psig, then better locking and pressure holding engagements are necessary to provide a suitable safety factor.

Thus, it may be considered a principal object of the present invention to provide the method or means to obtain an improved form of relatively large sloping-sided groove in an end cap of a fluid power cylinder for having a locked-in end portion of the tubular body section, along with a separate press-fit encompassing band whereby to effect a resulting tight joining of the sections of the power cylinder unit, particularly resistant against longitudinally hydraulic forces. Preferably the groove in the end cap will have a flat-bottomed portion such that an adequate portion of end cap metal can be rolled over the end of the body section down in the groove.

While various methods may be used to effect the tight rolling or pressing of a tie band member over a prior assembly, it may be considered a further object of the present invention to provide for a press-fit of the end of the tubular body section over the inserted end portion of an end cap section so as to turn provide a resulting slight enlargement of the exterior of the tubular body section at the engagement zone and, additionally, provide for a rapid, non-rolling, step for placing a separate press-fitted, encircling tie band over the prior assembly.

As still another object of the invention, there is incorporated the use of a high voltage magnetic pulse system to effect the compression and tight-fitting of an encircling tie band member around a previously assembled tubular body, member and end cap section so as to achieve a desired strong pressure resistant final assembly.

In one embodiment, the present invention provides a fluid power cylinder having a tubular body section, metallic end caps, an internal piston member and piston rod means extending through at least one of the end caps, the improved method of providing a non-loosening connection between an end cap and the tubular body section, which comprises the steps of; providing an extended width peripheral portion for the end cap sized to fit into an end of the tubular body section; forming a continuous peripheral shoulder around said end cap which is of larger diameter than said extended width portion adapted to engage said body section and which will form an abutting stop for the latter when they are assembled; further forming a peripheral groove in said cap adjacent said shoulder, with said groove bottom being of lesser diameter than said extended width portion of the cap and said groove further having a sloping wall portion angled upwardly from the bottom thereof toward such extended width portion; effecting a coupling between the end cap and said tubular body section to a point where the end of the latter abuts said shoulder of said cap and then permanently deforming the end of the body section down into said groove until the body section conforms to the bottom and sloping wall portion of such groove; subsequently rolling and wedging a portion of the shoulder of said cap continuously down over said deformed end portion of the tubular body section in said groove, whereby there is an initial tight peripheral clamping of the end cap to the body section, and further effecting the pressing of an encircling metal tie band over the rolled and engaged portions of the end of the tubular body section and the end cap, whereby there is a resulting high pressure resisting engagment.

In a preferred embodiment, the metal tie band will be compressed around the sub-assembly of end cap and rolled-in end portion of the body section by the high energy magnetic field pulse method because such method causes the band metal to actually deform down into the remaining groove portions around the end of the tubular body section and result in a tight clamping construction. With regard to this type of operation, reference may be made to U.S. Pat. No. 2,976,907, which teaches this type of metal forming procedure.

Although a V-groove may be sufficient to provide for the interlocking of the end of the body section with the cap member and permit the rolling of some cap metal over the end of the tube, particularly when a magnetic field force is used to tighten the tie band, it is a particular feature of this invention to provide for a larger, specially formed groove within end cap sections. Thus, it is preferred that there is at least a small flat portion within the bottom of the groove and, in addition, a sloping wall portion for the end of the tubular body section such that a peripheral portion of shoulder from the end cap may overlap a resulting flattened end portion of the tubular body section in the groove and provide the initial clamping between the parts. Also, preferably, the rolling of the shoulder portion of the end cap will be such as to have an external circumference about equal to the exterior of the body cylinder so that an encompassing tie band can readily be compressed into a tight fit over both such portions in its final fixed position.

Generally, the groove in the end cap section will be cut by a suitable cutting tool in a manner to leave a resulting small flat bottom portion extending circumferentially alongside of a straight should part of the end cap, as well as having a sloping wall section. Thus, subsequently, the rolling, or otherwise pressing, of the end portion of the tubular body section into the groove will, in turn, provide a small flat end piece and a resulting sloping transition piece from the bottom of the groove up toward the main body portion of the cylindrical body section. In one type of procedure, a suitable disc member capable of rolling around an assembled end cap portion and the tubular body section, or alternatively, the means for moving an assembled fluid power cylinder with respect to a fixed position rolling disc member, will provide a suitable method for the tight fitting of the end portion of the tubular body section down into the groove so as to bring about a resulting conformity of the latter with such groove. With low conductivity metals such as stainless steel, the rolling method of deformation will be necessary; however, with carbon steel body sections, there may also be used a quickly released, high energy electromagnetic impulse to effect the compressing or forcing of the end of the tube down into the groove, in a manner equivalent to that obtained by swaging or die forming.

As a next step, a suitable disc member will generally be used to provide for the cutting and the rolling of a portion of the shoulder of the end cap section so that it will be deformed to have a circumferential lip that laps down over the flattened end portion of the tubular body section and at least a part of the sloping wall transition section. This rolled and lapped construction will assist in providing a resulting leak-proof, pressure-tight assembly between the tubular body section and the end cap members, with the added factor of a high degree of longitudinal strength.

In addition to the foregoing, as part of the overall assembly system of the present invention and as heretofore noted, there is provided a reinforcing tie band which is compression fitted over the rolled and engaged portions of the body section and the end cap. In order not to require an off-set ring or two-dimensional band, the preferred construction has the rolled shoulder part of the cap be finished to have an external diameter about the same as the cylindrical body section O.D. at the connection, such that the reinforcing ring can be press-fitted over both the end of the body section and the rolled-down shoulder portion on the end cap. As will also be set forth subsequently in more detail, the tie band can be just slightly larger than the O.D of the tube and thus sized to be mechanically forced over the slightly larger tube end and cap area to be in a press-fit therearound or, alternatively, and preferably, the tie band can be compressed or "shrunk" by a high energy, quickly released magnetic pulse to cause the tie band to be in tight press-fit over that portion of the end of the tube which is the groove of the end cap member.

Reference to the accompanying drawings and the following description thereof will serve to show the means for effecting the joining of a tubular body section and an end cap member so as to effect both a longitudinally and circumferentially strong assembly for a fluid power cylinder.

Figure 1:
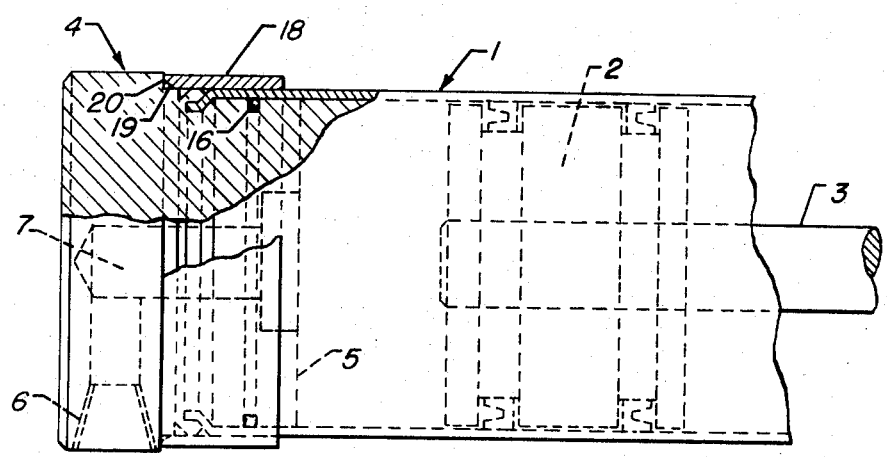
FIG. 1 of the drawing is an elevational view, partially in section, of the improved pressure resistant assembly between the tubular body section and an end cap section for a fluid power cylinder.

Referring now particularly to FIG. 1 there is indicated a typical fluid power cylinder in that it has a tubular body portion 1 adapted to accommodate an internal piston member 2 and connecting rod 3, with the latter adapted to extend through an opposing end cap section not shown. At the end portion of the cylinder illustrated, there is provided an end cap member 4 that has an extended width peripheral portion 5 adapted to be a tight press-fit within the end portion of the tubular body section 1. There is also indicated diagrammatically a fluid port 6 connecting with passageway means 7 which in turn connects with the interior of the fluid cylinder so as to provide fluid pressure to the fluid piston member 2.

Figure 2:
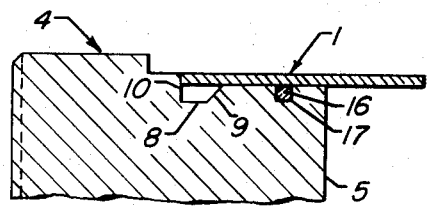
FIGS. 2, 3 and 4 indicate diagrammatically the improved method of effecting the connection between the end of a tubular body section and a grooved end cap section for a fluid power cylinder assembly in accordance with the present improved system.
Figure 3:
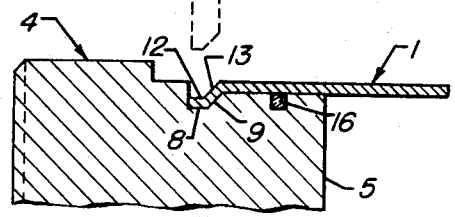
Figure 4:
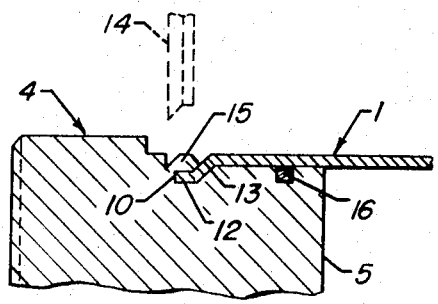

As best shown in the enlarged FIGS. 2, 3 and 4, in order to effect the assembly of the end cap 4 with the body section 1, in accordance with a part of the present improved system, there is provided a groove in the cap member 4 with a flat-bottom 8 and a sloping wall portion 9. The groove is also formed to have a straight wall shoulder portion 10 in order that the end of the tubular body section 1 may be initially assembled to abut tightly against such straight wall shoulder portion 10. As a means of carrying out the improved assembly of the unit under the method of the present invention, after the end cap 4 has been inserted into the end of the cylindrical or tubular body section 1, as shown in FIG. 2, there is then effected an inward rolling and/or pressure deformation of the end of the body section 1. Where stainless steel body sections are used, or other low conductivity metals are used, then generally, the deformation will be by a roller member, which is here indicated by the dashed line 11, so that there will be enough pressure to cause the end portion of cylinder 1 to in turn have a shape conforming with that of the groove in the end cap member 4. In other words, there will be a small flat end portion 12 pressured inwardly to rest against the flat-bottom portion 8 while, at the same time, there will be a sloping wall portion 13 rolled tightly against the sloping groove portion 9 for the end cap 4. However, with carbon steel body sections, or other good electrical conductors, the deformation of the end of cylinder into groove 8 may be by magnetic impuse, as heretofore mentioned.

In a subsequent operation, as best shown by FIG. 4, a roller member, such as indicated by the dashed lines 14, is utilized to cut into or bear inwardly against a peripheral portion of end cap 4 at a distance spaced slightly away from the vertical shoulder line 10 such that a portion of the latter will be deformed or rolled into a lip-like member 15 that covers over the short flat end portion 12 and a part of the sloping wall portion 13 of the rolled end portion of cylindrical body section 1. By this operation there is a completely sealed assembly of the end cap 4 with the tubular section 1. In order to provide additional seal means there is also shown the use of an O-ring 16 in a groove means 17 extending circumferentially around the inserted part of the end cap 4. Thus, as the end of the cylinder 1 is pressed over the end cap 4, there is a tight seal with the O-ring 16.

Figure 5:
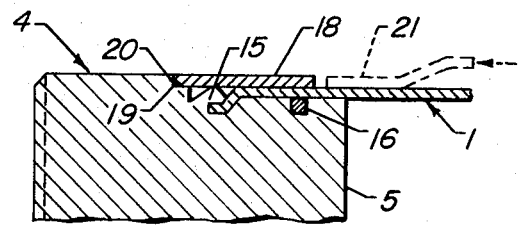
FIGS. 5 and 5A indicate diagrammatically means for effecting the placement of the encircling metal reinforcing ring over the previously rolled-in and engaged portions of the assembly.

In accordance with the present invention, a still further assembly step is effected to preclude any blow-out of the end cap 4 or any circumferential turning of the assembled members. Such step includes the addition of the reinforcing tie band 18 around the grooved and engaged end caps 5 and the tubular body section 1. With particular reference to FIG. 5 of the drawing, there is indicated the use of a wide band 18 extending over the O.D. of the body section 1 and the rolled lip-like portion 15. As heretofore noted, this assembly can be made by forcing a close tolerance ring over the rolled and locked-in area or, preferably, the tie band can be compressed over the desired area by the magnetic pulse system.

For the force-fit type of assembly, the O.D. of the latter will preferably be about the same as the O.D. of the cylindrical body portion 1, such that the I.D. of the circular band 18 will be tight against both sections as it is press-fit over the initial assembly by suitable push from a force supplying member 21. Also, in this type of assembly, the bands 18 are slipped over the tubing 1 in order to be on the tubing prior to its being pressed over the end caps because when the tubing is forced on the end caps 5 there is a slight enlargement of the tubing of perhaps by 0.01 inch ± in outside diameter. Preferably a shoulder 20 is provided around end cap 4 to, in turn, provide a suitable stop for the band 18 when it is being pressed around the assembled parts. Also the external interior edge portion of the ring or band 18 may be chamfered to 19 to assist in a pushing or "forcing-on" type of press-fit assembly.

Figure 5A:
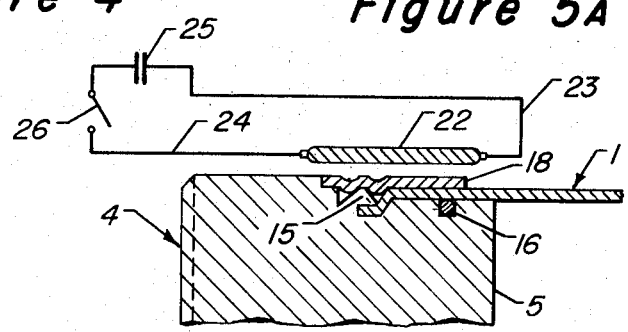

In FIG. 5A, where the preferred magnetic impulse procedure is used to compress the bands 18 into a press-fit over the assembled tube 1 and end cap 5 area, then the bands 18 can be made to have a suitable clearance over tubular body section 1 and the magnetic force field is capable of pressing and deforming the band 18 tightly down onto the prior assembly. In fact, the inside portion of the band will be deformed to generally conform with the shape of rolled assembly at the zone of the grooving as shown in the drawing. Th magnetic coil which will be used to provide the desired high energy magnetic field is indicated diagrammatically as 22. Also, there is shown in diagrammatic manner, cables 23 and 24 to capacitor 25 and switch means 26 such that there is the means to rapidly discharge the necessary high energy magnetic pulse which can effect the tie band compression and deformation.

Typically, the reinforcing band 18 will be fabricated of coldrolled steel or of aluminum to permit the efficient use of the magnetic field compression-deformation procedure and to provide suitable high tensile strength to, in turn, result in a desired pressure resistant fluid power cylinder which can be capable of withstanding pressures up to at least about 4,200 psig, before having a breakage of the end cap from the tubular body member. Actually, an aluminum band which has been just previously annealed, by heating to about 975° F. and followed by water quenching, provides a tie band which is preferred over a cold rolled steel band to the extent that the aluminum is soft after the annealing and will conform better to the residual grooves in the periphery of the end cap during the magnetic pulse compression step. After the compression and deformation step, the aluminum end will age harden at room temperature to reach an optimum strength in a period of about four days time. In most of the commonly used cylinders, the body cylinder is of stainless steel tubing material and the end caps are of aluminum, or other material softer than the body portion 1; however, it is not intended to limit the present improved assembly construction to any preset types of materials for the cylinder, end-caps or tie band members.

I claim as my invention:

1. In a fluid power cylinder having a tubular body section, metallic end caps, an internal piston member and piston rod means extending through at least one of the end caps, the improved method of providing a non-loosening connection between an end cap and the tubular body section, which comprises the steps of:
   a. providing an extended width peripheral portion for the end cap sized to fit into an end of the tubular body section,
   b. forming a continuous peripheral shoulder around said end cap which is of larger diameter than said extended width portion adapted to engage said body section and which will form an abutting stop for the latter when they are assembled,
   c. further forming a peripheral groove in said cap adjacent said shoulder, with said groove bottom being of lesser diameter than said extended width portion of the cap and said groove further having a sloping wall portion angled upwardly toward such extended width portion,
   d. effecting a coupling between the end cap and said tubular body section to a point where the end of the latter abuts said shoulder of said cap and then permanently deforming the end of the tubular body section down into a said groove until such body section conforms to the bottom and sloping wall portion of said groove,
   e. subsequently rolling and displacing a portion of the shoulder of said cap continuously down over the deformed end portion of the tubular body section in said groove, whereby there is an initial tight peripheral clamping of the end cap to the body section, and
   f. effecting the pressing of an encircling metal band over the rolled portion of the shoulder and the deformed end portion of the tubular body section which is in said groove, whereby to effect a circumferential locking of cap and body sections together in a high pressure resisting engagement.

2. The improved connection method of claim 1 further characterized in that said peripheral groove has a flat-bottomed portion such that at least an end portion of the tubular body section will be deformed down into such flat-bottomed groove for coverage by end cap metal.

3. The improved method of claim 1 further characterized in that a shaped roller of disc-like form is provided to move into a position with respect to the assembled tubular body section and end cap and effect a rolling deformation of the end of the tubular body section to fit into the bottom portion of said groove and at the same time have a sloping wall portion tightly fitting against the sloping wall portion of said groove.

4. The method of claim 1 further characterized in that a disclike roller is provided to move peripherally with respect to the end cap portion of the fluid power cylinder and effect said displacement and deformation of a peripheral portion of the end cap at a position adjacent the shoulder thereof and effect the rolling of a lip-like circumferential member tightly over and around said flattened end portion of said tubular body section, whereby to effect a tight circumferential seal over the latter.

5. The improved method of claim 1 further characterized in that a peripheral electromagnetic field producing coil which can rapidly discharge a high energy force field is provided in a manner to encompass the assembled tubular body section with said end cap and said encircling metal tie band and a suitable predetermined magnetic field pulse is impacted to said tie band to cause it to be compressed and conformed over the body section and cap assembly for the desired high pressure resistant engagement.

6. The improved method of claim 1 further characterized in that said encircling metal band is of aluminum and such band is subjected to annealing by being heated to a temperature level of the order of about 975° F. to being placed over the rolled portion of the shoulder of the end cap and the end of the tubular body section, and such assembly is subjected to a high energy magnetic field pulse sufficient to effect the compression and deformation of the band over said assembly to provide a desired high pressure resistant engagement.

* * * * *